US009030063B2

(12) United States Patent
Rawlinson et al.

(10) Patent No.: US 9,030,063 B2
(45) Date of Patent: May 12, 2015

(54) THERMAL MANAGEMENT SYSTEM FOR USE WITH AN INTEGRATED MOTOR ASSEMBLY

(75) Inventors: Peter Dore Rawlinson, Evesham (GB); Nicholas John Sampson, Rolling Hills Estates, CA (US); Nicholas Robert Kalayjian, San Carlos, CA (US); Vincent George Johnston, Half Moon Bay, CA (US); David Fred Nelson, Menlo Park, CA (US); Gary Allen Pinkley, Fremont, CA (US); Wulfer Adrijan de Bruijn, Redwood City, CA (US); Benjamin David Dettmann, San Francisco, CA (US); Nicolas Verzeni, San Francisco, CA (US); Michael Raj Kubba, Mountain View, CA (US); Edwin M. Pearce, Jr., San Francisco, CA (US); Jim Robbins, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 407 days.

(21) Appl. No.: 13/326,463

(22) Filed: Dec. 15, 2011

(65) Prior Publication Data
US 2012/0153718 A1 Jun. 21, 2012

Related U.S. Application Data

(60) Provisional application No. 61/424,430, filed on Dec. 17, 2010.

(51) Int. Cl.
*H02K 9/00* (2006.01)
*H02K 9/19* (2006.01)
(Continued)

(52) U.S. Cl.
CPC .. *H02K 9/19* (2013.01); *H02K 9/22* (2013.01); *H02K 9/20* (2013.01); *H02K 5/20* (2013.01); *H02K 7/006* (2013.01); *H02K 11/0073* (2013.01); *Y02T 10/641* (2013.01); *B60L 1/003* (2013.01); *B60L 3/003* (2013.01); *B60L 3/0061* (2013.01); *B60L 11/005* (2013.01); *B60L 11/1803* (2013.01); *B60L 11/1816* (2013.01); *B60L 11/1864* (2013.01);
(Continued)

(58) Field of Classification Search
CPC .............. H02K 9/19; H02K 9/20; H02K 9/22
USPC ..................................... 310/52, 54
See application file for complete search history.

(56) References Cited

U.S. PATENT DOCUMENTS 4,365,176 A * 12/1982 Nathenson et al. ............. 310/54
6,448,535 B1 * 9/2002 Ap ................................. 219/208
(Continued)

*Primary Examiner* — Alex W Mok
(74) *Attorney, Agent, or Firm* — J. Richard Soderberg

(57) ABSTRACT

An integrated drive system assembly is provided that combines an electric motor, a power inverter assembly and a gearbox into a single, multi-piece enclosure. Combining these components into a single enclosure reduces weight, reduces drive system complexity, reduces system volume, simplifies assembly integration into an electric vehicle, reduces manufacturing cost, allows the flexible and lengthy electrical cables between the power inverter and the electric motor to be replaced with short, low loss, rigid bus bars, and simplifies component cooling by allowing the use of a common thermal management system, i.e., a mutual thermal management system. The common thermal management system includes a liquid coolant loop that is thermally coupled to the electric motor, the power inverter assembly and the gearbox.

16 Claims, 9 Drawing Sheets

(51) Int. Cl.
  *H02K 9/22* (2006.01)
  *H02K 9/20* (2006.01)
  *H02K 5/20* (2006.01)
  *H02K 7/00* (2006.01)
  *H02K 11/00* (2006.01)
  *B60L 1/00* (2006.01)
  *B60L 3/00* (2006.01)
  *B60L 11/00* (2006.01)
  *B60L 11/18* (2006.01)

(52) U.S. Cl.
  CPC ......... *B60L 2210/10* (2013.01); *B60L 2240/34* (2013.01); *B60L 2240/36* (2013.01); *B60L 2240/525* (2013.01); *Y02T 10/7088* (2013.01); *Y02T 10/7005* (2013.01); *Y02T 10/7022* (2013.01); *Y02T 10/7061* (2013.01); *Y02T 10/7216* (2013.01); *Y02T 90/121* (2013.01); *Y02T 90/14* (2013.01); *Y02T 90/127* (2013.01)

(56) References Cited

U.S. PATENT DOCUMENTS

| | | | |
|---|---|---|---|
| 7,104,347 B2* | 9/2006 | Severinsky et al. | 180/65.23 |
| 7,147,071 B2* | 12/2006 | Gering et al. | 237/12.3 B |
| 7,237,634 B2* | 7/2007 | Severinsky et al. | 180/65.23 |
| 7,489,057 B2 | 2/2009 | Zhou et al. | |
| 7,579,725 B2 | 8/2009 | Zhou et al. | |
| 8,336,319 B2 | 12/2012 | Johnston et al. | |
| 2002/0040896 A1* | 4/2002 | Ap | 219/208 |
| 2003/0217876 A1* | 11/2003 | Severinsky et al. | 180/65.2 |
| 2005/0115748 A1* | 6/2005 | Lanier | 180/65.1 |
| 2005/0133215 A1* | 6/2005 | Ziehr et al. | 165/202 |
| 2005/0241865 A1* | 11/2005 | Varenne | 180/65.1 |
| 2006/0100057 A1 | 5/2006 | Severinsky et al. | 477/4 |
| 2006/0231305 A1* | 10/2006 | Severinsky et al. | 180/65.2 |
| 2008/0048457 A1* | 2/2008 | Patel et al. | 290/1 R |
| 2008/0251235 A1* | 10/2008 | Zhou | 165/41 |
| 2009/0024256 A1* | 1/2009 | Adams et al. | 700/300 |
| 2009/0139781 A1* | 6/2009 | Straubel | 180/65.1 |
| 2009/0227194 A1* | 9/2009 | Johnston | 454/152 |
| 2009/0280395 A1* | 11/2009 | Nemesh et al. | 429/62 |

* cited by examiner

THERMAL MANAGEMENT SYSTEM FOR USE WITH AN INTEGRATED MOTOR ASSEMBLY

CROSS-REFERENCE TO RELATED APPLICATION

The present application claims benefit of the filing date of U.S. Provisional Patent Application Ser. No. 61/424,430, filed 17 Dec. 2010, the disclosure of which is incorporated herein by reference for any and all.

FIELD OF THE INVENTION

The present invention relates generally to electric motors and, more particularly, to a thermal management system for use with an integrated motor assembly.

BACKGROUND OF THE INVENTION

The trend towards designing and building fuel efficient, low emission vehicles has increased dramatically over the last decade, this trend driven by concerns over the environment as well as increasing fuel costs. At the forefront of this trend has been the development of hybrid vehicles, vehicles that combine a relatively efficient combustion engine with an electric drive motor.

Currently, most common hybrids utilize a parallel drive system in which power to the wheels is via planetary gears and a transaxle, the power coming from either, or both, a combustion engine and an electric motor. In an alternate hybrid configuration, typically referred to as an integrated motor assist or IMA system, the electric motor is positioned between the combustion engine and the drive system's transmission, the transmission coupling power through the axle to the wheels.

Although hybrids, in general, provide improved fuel efficiency and lower emissions over those achievable by a non-hybrid vehicle, such cars typically have very complex and expensive drive systems due to the use of two different drive technologies. Additionally, as hybrids still rely on an internal combustion engine for a portion of their power, the inherent limitations of the engine prevent such vehicles from achieving the levels of pollution emission control and fuel efficiency desired by many. Accordingly several car manufacturers are developing, and in some instances manufacturing, vehicles that utilize an all-electric drive system. The present invention provides an improved drive system for such a vehicle.

SUMMARY OF THE INVENTION

The present invention provides an integrated drive system assembly that combines an electric motor (e.g., an AC motor), a power inverter assembly and a gearbox into a single, multi-piece enclosure. Combining these components into a single enclosure reduces weight, reduces drive system complexity, reduces system volume, simplifies assembly integration into an electric vehicle, reduces manufacturing cost, allows the flexible and lengthy electrical cables between the power inverter and the electric motor in a conventional electric vehicle to be replaced with short, low loss, rigid bus bars, and simplifies component cooling by allowing the use of a common thermal management system, i.e., a mutual thermal management system. The common thermal management system includes a liquid coolant loop that is thermally coupled to the electric motor, the power inverter assembly and the gearbox.

In at least one embodiment of the invention, the liquid coolant loop is coupled to the integrated drive system assembly via a single coolant inlet and a single coolant outlet. The common thermal management system may be configured to split the liquid coolant loop into a first coolant flow path (for example, comprising 20% of the flow) and a second coolant flow path (for example, comprising 80% of the flow), where coolant within the first flow path flows through the electric motor rotor and a gearbox coolant plate before passing through the assembly's single coolant outlet, and where coolant within the second flow path flows through a plurality of stator coolant channels and at least one inverter cold plate before passing through the assembly's single coolant outlet. The at least one inverter cold plate may be comprised of three drive inverter phase cold plates. The plurality of stator coolant channels may be mechanically and thermally coupled to an outer housing member of the motor stator. The liquid coolant within the second coolant flow path preferably passes through an internal stator to inverter coolant passageway that is interposed between the stator coolant channels and the inverter cold plate(s). The integrated drive system assembly may further comprise a coolant manifold within the power inverter assembly, where the coolant manifold includes a plurality of coolant inlet and outlet pairs, and wherein liquid coolant flows through the plurality of coolant inlet and outlet pairs into and out of the inverter cold plate(s).

In at least one embodiment of the invention, the integrated drive system assembly includes a plurality of solid metal bus bars (e.g., copper bus bars) that are disposed within the single, multi-piece enclosure and which electrically connect the power inverter to the electric motor.

In at least one embodiment of the invention, the integrated drive system assembly includes a subframe structural member, where the integrated assembly is attached to the subframe structural member via a pair of brackets attached to the multi-piece enclosure.

In at least one embodiment of the invention, the gearbox is a single speed, fixed gear gearbox that is coupled to a pair of drive half shafts.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The terms "battery pack" and "energy storage system" may be used interchangeably to refer to a system for storing energy that has the capability to be charged and discharged, the energy stored within one or more batteries and/or within one or more capacitors/supercapacitors/ultra-capacitors, the batteries and/or capacitors electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 1:
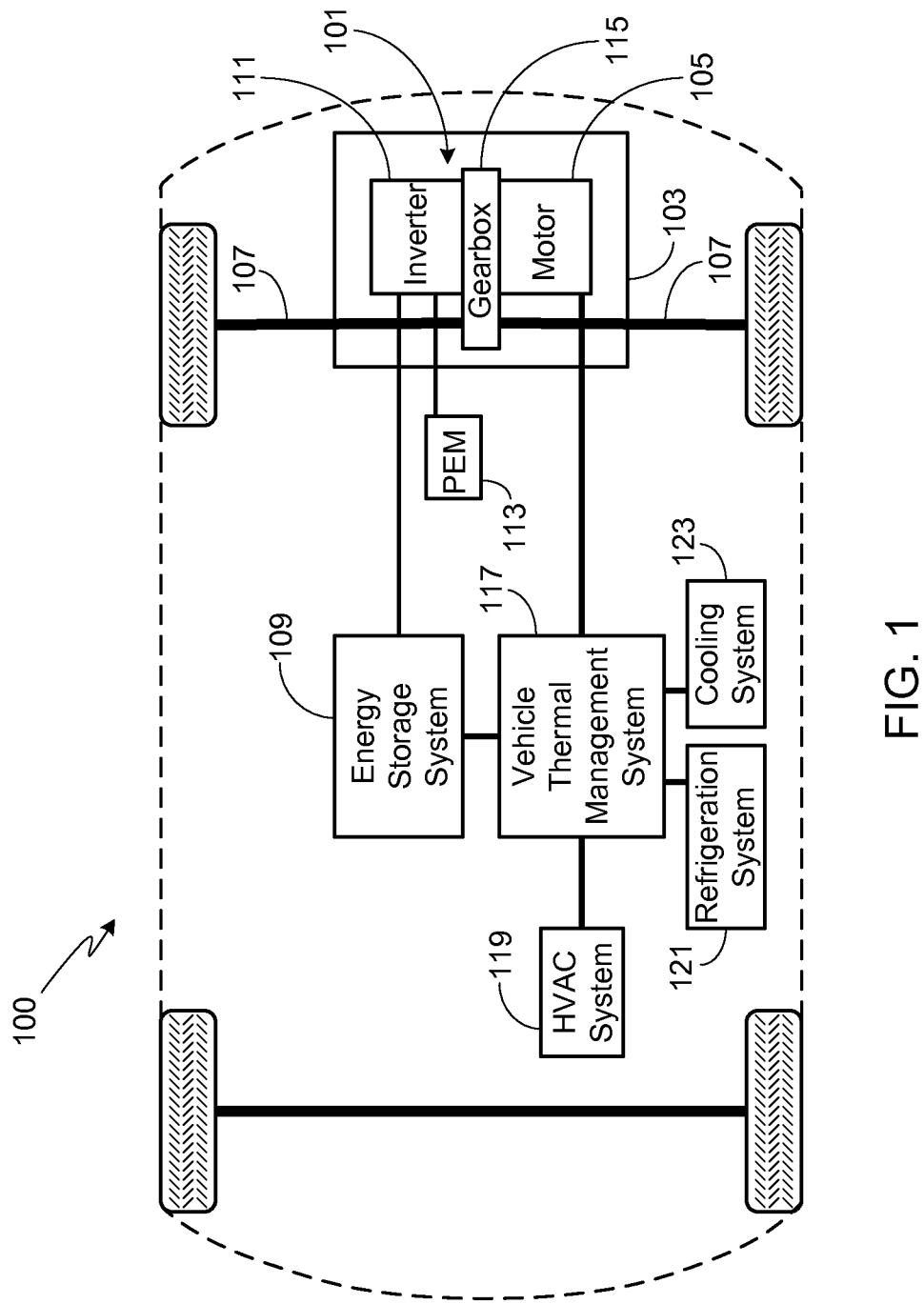
FIG. 1 schematically illustrates the primary components of a vehicle system in accordance with the present invention.

FIG. 1 schematically illustrates some of the principal components associated with an electric vehicle 100 in general, and the present invention in particular. Preferably vehicle 100 is an EV, although it will be appreciated that the invention may also be used with a hybrid vehicle, e.g., a PHEV or an HEV. Vehicle 100 includes an integrated drive system assembly 101 mounted to a subframe structural member 103. As shown and described further below, assembly 101 is assembled as a single unit utilizing a multi-piece housing.

Within integrated drive system assembly 101 is an electric motor 105. Preferably motor 105 is a three phase alternating current ("AC") motor. Motor 105, via a pair of drive half-shafts 107, provides propulsive power to vehicle 100 and is coupled to an energy storage system 109. In addition to energy storage means, e.g., batteries, energy storage system 109 preferably includes the various heating, cooling, and monitoring subsystems that are required to optimize battery pack performance and safety. In addition to motor 105, integrated drive system assembly 101 also includes an inverter 111. Inverter 111 converts the direct current ("DC") supplied by the battery pack to the three-phase AC used to power preferred motor 105. In at least some embodiments, inverter 111 includes transistors, e.g., one or more field effect transistors ("FETs"), metal oxide semiconductor FETs, and/or insulated gate bipolar transistors (IGBTs).

A power control module 113, i.e., PEM 113, is coupled to inverter 111 and either mounted within the integrated drive system assembly 101 or mounted outside of assembly 101 as preferred. Power control module 113 may be comprised of passive power devices (e.g., transient filtering capacitors and/or inductors), active power devices (e.g., semiconductor and/or electromechanical switching devices, circuit protection devices, etc.), sensing devices (e.g., voltage, current, and/or power flow sensors, etc.), logic control devices, communication devices, DC/DC converters for converting the energy supplied by inverter 111 to a suitable level for various vehicle systems (e.g., auxiliary systems, HVAC system, entertainment system, lighting, etc.), charging circuits, etc.

Integrated drive system assembly 101 also includes a gearbox 115. Gearbox 115 is preferably a single speed, fixed gear gearbox, although it will be appreciated that other configurations may be employed such as a 2-gear gearbox.

Vehicle 100 also includes a thermal management system 117 that is used to control the various thermal systems integral to vehicle 100 and to insure that the temperatures of the various vehicle subsystems are maintained within the desired operating ranges for each. In the preferred embodiment, thermal management system 117 is coupled to battery pack 109, passenger cabin heating, ventilation and air conditioning (HVAC) system 119, a refrigeration system 121, a liquid coolant circulating system 123, and integrated drive assembly 101. Typically thermal management system 117 uses a plurality of temperature detectors (not shown) to monitor the temperature within the vehicle components (e.g., motor, inverter, gearbox, etc.), passenger cabin and coolant/refrigeration systems in order to determine the appropriate operation, configuration and regulation of the various thermal subsystems.

Refrigeration subsystem 121 is designed to be thermally coupled to one or more of the other thermal subsystems whenever it is necessary, or desirable, to reduce the temperature in the thermally-coupled subsystem. Refrigeration subsystem 121 may utilize a refrigerant (e.g., R134a) compression system, a thermo-electric cooler, or other means. In at least one embodiment, subsystem 121 includes a compressor that compresses the low temperature refrigerant vapor in the subsystem into a high temperature vapor. The refrigerant vapor then dissipates a portion of the captured heat when it passes through a condenser, thereby leading to a phase change from vapor to liquid, the liquid remaining at a high temperature and pressure. Preferably the performance of the condenser is enhanced by using a blower fan. The liquid phase refrigerant then passes through a receiver-dryer that removes moisture from the condensed refrigerant. In at least one embodiment, the refrigerant line is coupled to a cabin evaporator via a first thermal expansion valve, and to a heat exchanger (i.e., a chiller) via a second thermal expansion valve. The thermal expansion valves control the flow rate of refrigerant into the evaporator and the chiller.

HVAC subsystem 119 provides temperature control for the vehicle's passenger cabin, typically via a plurality of ducts and vents. Preferably HVAC subsystem 119 includes one or more fans that are used to circulate air throughout the cabin on demand, regardless of whether the air is heated, cooled, or simply fresh air from outside the vehicle. To provide cool air, refrigerant is circulated through an evaporator. To provide warm air during normal vehicle operation, HVAC subsystem 119 may utilize a heater, for example a PTC heater integrated within the evaporator. HVAC subsystem 119 may also include means such as a heat exchanger for transferring thermal energy from the drive train and/or the battery pack to the HVAC subsystem.

Cooling system 123 is comprised of a continuous power train cooling loop that is used to cool the drive motor 105, the vehicle's principal traction motor. The cooling loop of system 123 is also used to cool gearbox 115 and inverter 111 as described in detail below. Cooling system 123 may or may not be thermally coupled to other vehicle components, for example the power electronics module 113. If vehicle 100 includes an on-board charger (not shown), for example for charging battery pack 109, preferably the charger is also coupled to cooling system 123. Cooling system 123 also includes a coolant pump to circulate the coolant through the cooling loop. Preferably cooling system 123 also includes a radiator for discharging the heat to the ambient atmosphere, a fan for forcing air through the radiator when insufficient air is passing through the radiator to achieve the desired level of cooling, and a coolant reservoir. Preferably both refrigeration system 121 and cooling system 123 are coupled to a heat exchanger that allows the coolant within system 123 to be chilled by the refrigerant of system 121.

In the preferred system configuration, the cells within battery pack 109 are coupled to coolant system 123 and refrigeration system 121. Typically refrigeration system 121 is used to cool the coolant within a coolant loop associated with cooling system 123, for example using a heat exchanger. The coolant loop that is coupled to battery pack 109 may be the same as, or separate from, the coolant loop coupled to the integrated drive assembly 101.

In the following detailed description of the drive assembly 101, including the cooling system that is integrated within the assembly, it is assumed that the assembly is coupled to a coolant loop (e.g., cooling system 123) that is capable of providing liquid coolant at the required temperature and flow rate. As there are numerous possible configurations for such a thermal management system, further details regarding the overall thermal management system are not provided herein. An exemplary thermal management system is disclosed in co-pending U.S. patent application Ser. No. 12/835,486, filed 13 Jul. 2010, the disclosure of which is incorporated herein for any and all purposes.

Figure 2:
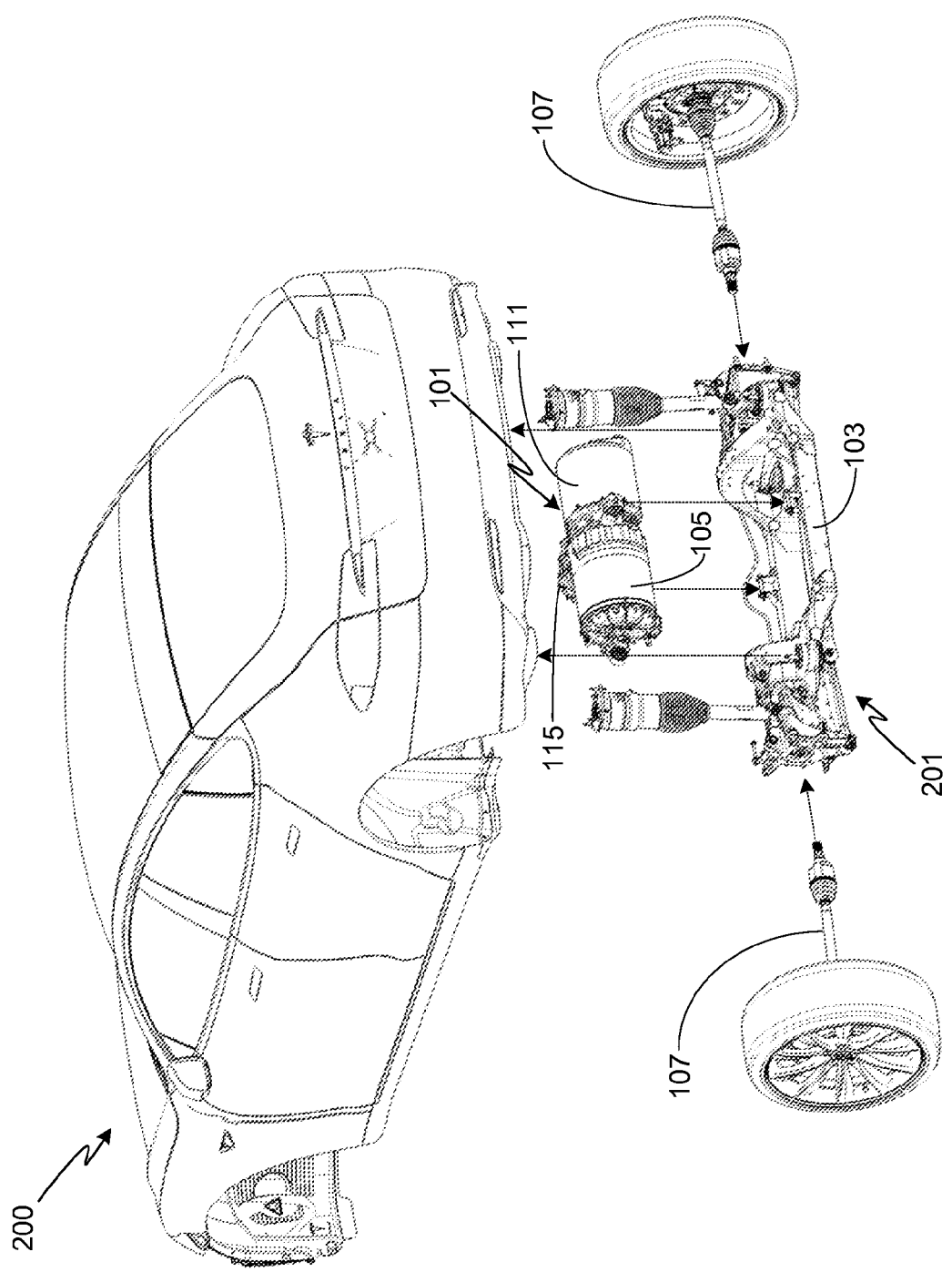
FIG. 2 provides a perspective view of the integrated drive system assembly of the present invention relative to the rear suspension assembly of a representative vehicle.

FIG. 2 provides a perspective, exploded view of the integrated drive system assembly 101 relative to the rear suspension assembly 201 of a representative vehicle 200. It should be appreciated that while FIG. 2 shows the integrated drive system assembly 101 mounted in a rear wheel drive configuration, other configurations are possible such as employing assembly 101 in a front wheel drive configuration, or in a configuration in which there is a drive system assembly 101 mounted to both the front and rear axles.

Figure 3:
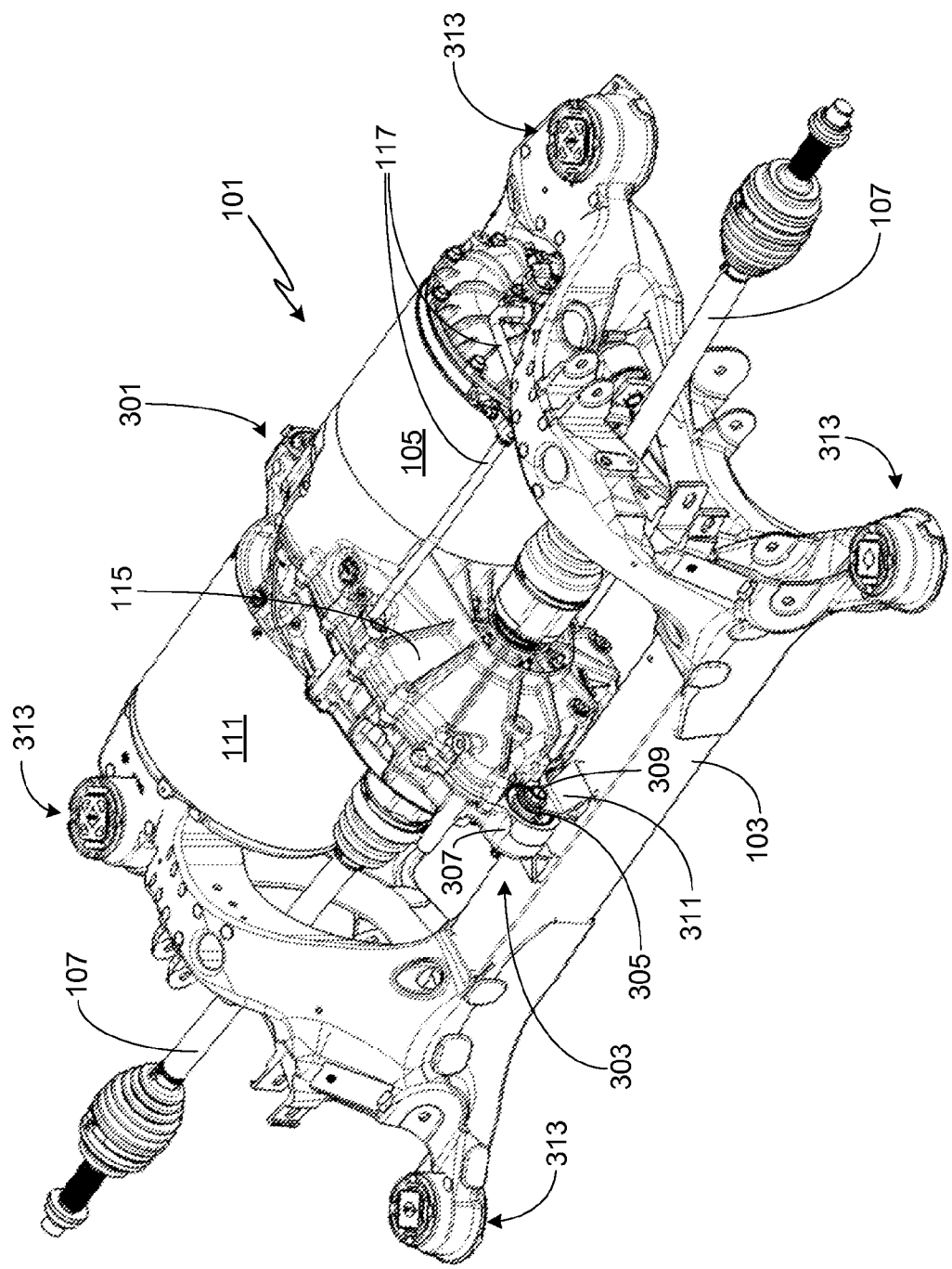
FIG. 3 provides a detailed perspective view of the integrated drive system assembly shown in FIG. 2.
Figure 4:
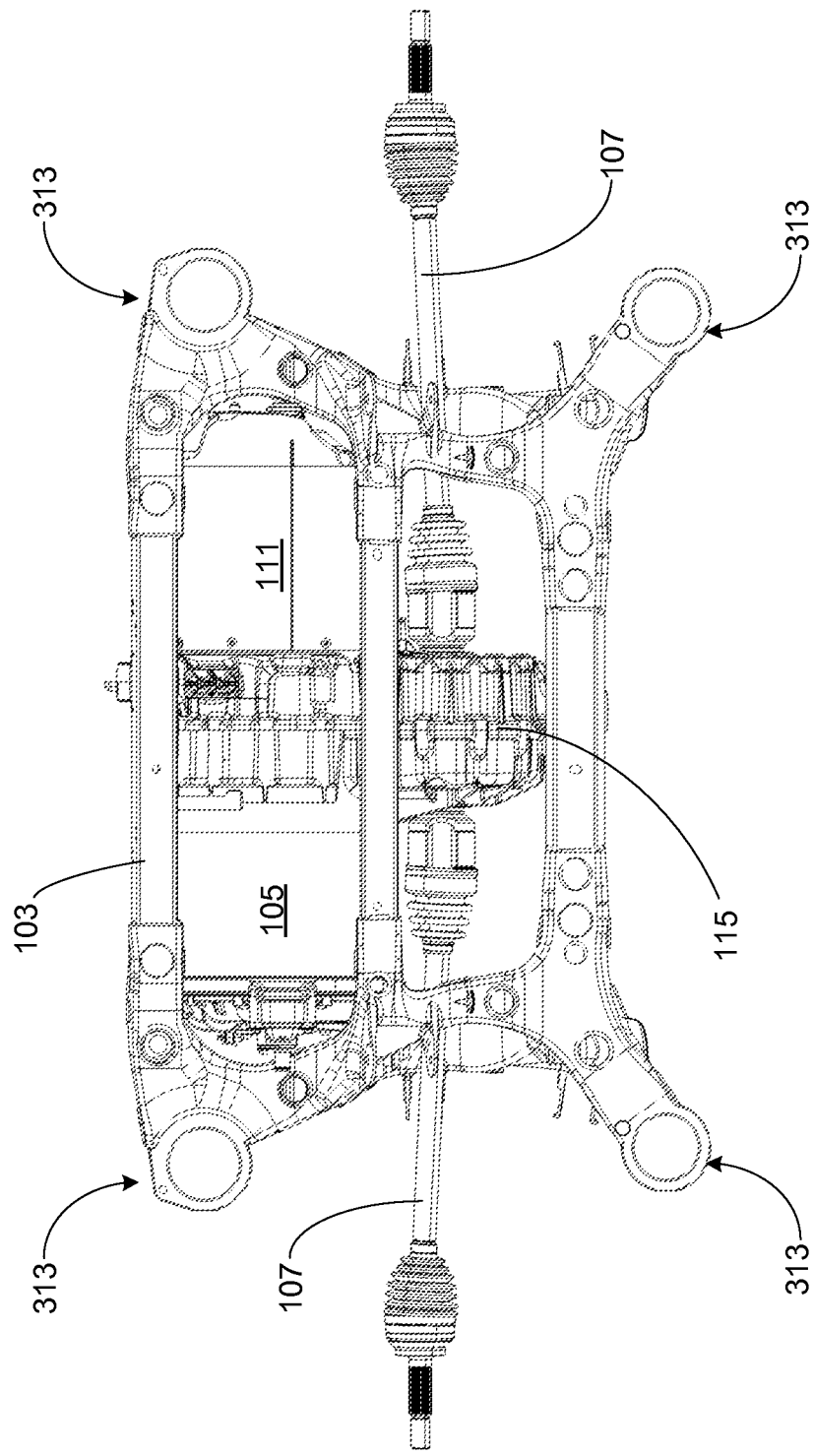
FIG. 4 provides a bottom view of the integrated drive system assembly shown in FIGS. 2 and 3.

FIG. 3 provides a detailed view of a preferred embodiment of integrated drive system assembly 101. Preferably, and as shown, assembly 101 is mounted to subframe structure 103 with a pair of mounts shown generally at locations 301 and 303. In this configuration, each mount uses a rubber (or synthetic) bushing 305 to couple the mounting bracket 307 of assembly 101 to bolt 309 and subframe mounting bracket 311. Note that in the preferred configuration, subframe structural member 103 includes four mounting brackets 313 for mounting member 103 to the vehicle. FIG. 4 provides a bottom view of the integrated drive system assembly 101 and subframe 103 shown in FIG. 3.

In a conventional electric vehicle, the power inverter and the motor are discrete drive system components mounted within separate housings and located at a relatively large distance apart. For example, while the motor in such a vehicle is typically mounted close to the drive axle, the power inverter is often mounted near the battery pack, e.g., in the trunk, under the seats, etc. As a result, the high voltage cables between the two are often quite long, on the order of meters. Additionally, due to the separate mounting locations of the motor and inverter in a conventional electric vehicle, these high voltage cables must be flexible, thus allowing for the uncoupled and independent movement of the two drive system components. Along with increased electrical connection complexity, mounting the motor at a separate and relatively distant location from the power inverter also complicates component cooling, especially if both the power inverter and the motor are liquid cooled. In such a configuration, discrete thermal management systems are often used with the motor and inverter.

Figure 5:
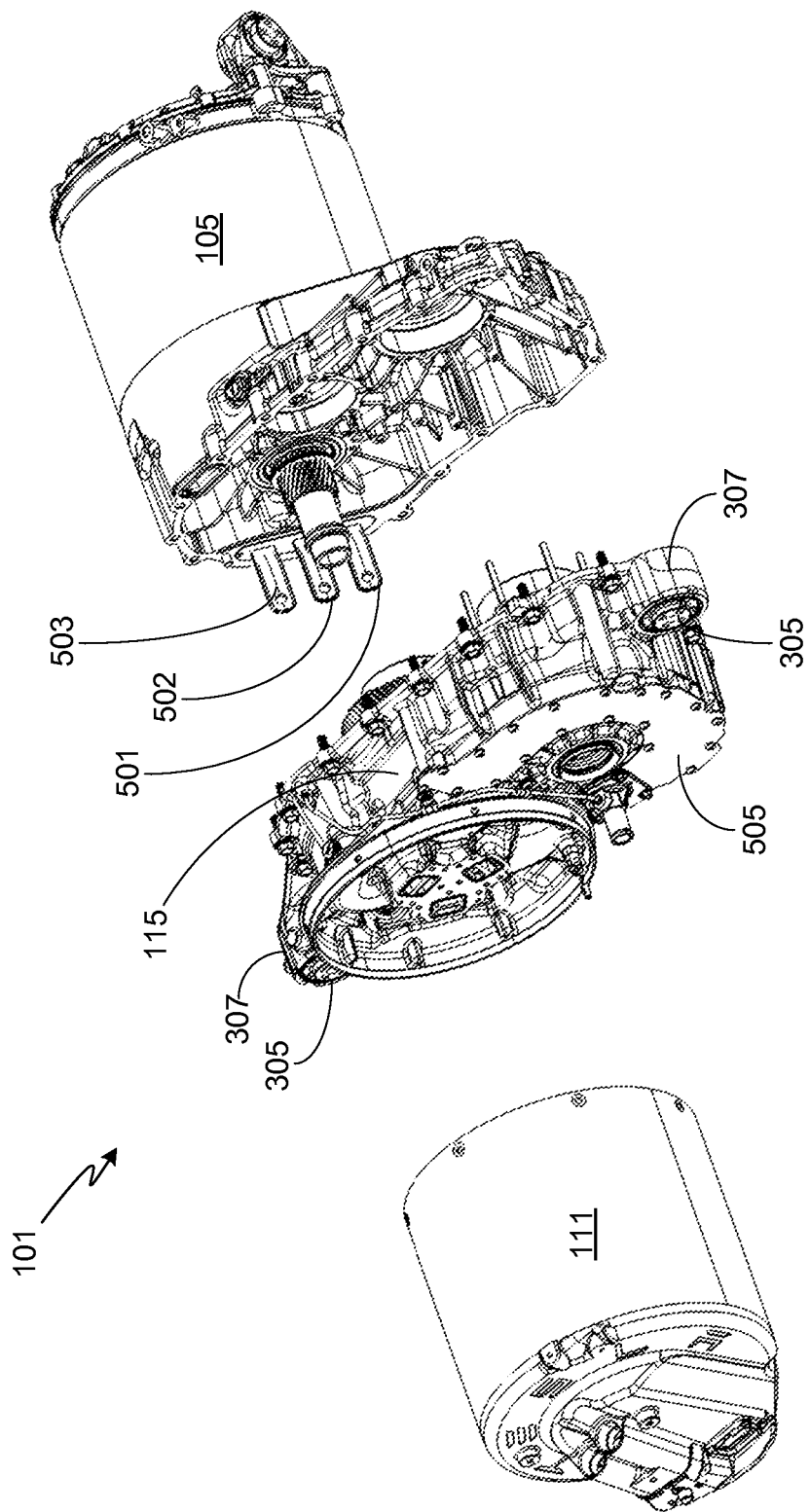
FIG. 5 provides an exploded perspective view of the integrated drive system assembly shown in FIGS. 2-4.

In contrast, the present integrated drive system assembly provides a compact design which, as a result of design simplicity, reduces overall system weight and manufacturing cost. One of the benefits of the present design is that the cables required to connect the power inverter to the motor in a conventional system are eliminated and replaced by three short, rigid bus bars 501-503. Bus bars 501-503 are visible in the exploded view of the integrated drive system assembly 101 shown in FIG. 5. It will be appreciated that each bus bar 501-503 may be comprised of a single piece or a multi-piece structure. In a preferred embodiment, bus bars 501-503 are fabricated from copper or other conductive material, and are on the order of 12 centimeters long, 2 centimeters wide and 0.5 centimeters thick. As such, the bus bars used in the integrated drive system assembly of the present invention decrease the length of the electrical connectors between the motor and the power inverter by a factor of approximately 100, thereby significantly simplifying system design and achieving substantial weight savings. Additionally, replacing the long, flexible electrical cables of the prior art with short, rigid, highly conductive bus bars decreases current losses between the power inverter and the motor, thus improving the electrical efficiency of the system.

In addition to lowering weight, reducing volume requirements, reducing manufacturing cost and simplifying construction of the drive system and its integration into the vehicle, the integrated drive system design of the present invention also simplifies system cooling. In a conventional system in which the power inverter is discrete from the motor, separate thermal management systems are typically utilized, complicating the overall thermal management system of the vehicle. Utilizing the present design, a single thermal management system may be used to control the temperature of motor 105, inverter 111 and gearbox 115.

While the use of a common thermal management system for the motor, inverter and gearbox reduces system complexity, specifically reducing the number of cooling couplings, conduits and pumps that are required to maintain the temperature of the various drive train components, this simplification of the thermal management system does not come about without its own problems. Most notably, each component within the integrated drive assembly has a preferred range of operating temperatures as well as very specific thermal characteristics (e.g., heat dissipation rates). As such, the requirements placed on the cooling system are quite complex and require the integration of a very sophisticated cooling system within drive assembly 101.

In the illustrated embodiment, liquid coolant is supplied to four distinct areas within assembly 101; specifically, the core of the motor rotor, the outer housing of the motor stator, the gearbox, and the drive inverter mega poles. In general, gearbox 115 is allowed to operate at much higher temperatures than the electronics contained in inverter 111. For example in one exemplary embodiment, gearbox 115 operate at temperatures as high as 100° C. while the electronics within inverter 111 are kept at much lower temperatures, e.g., on the order of 40° C. to 50° C.

Figure 6:
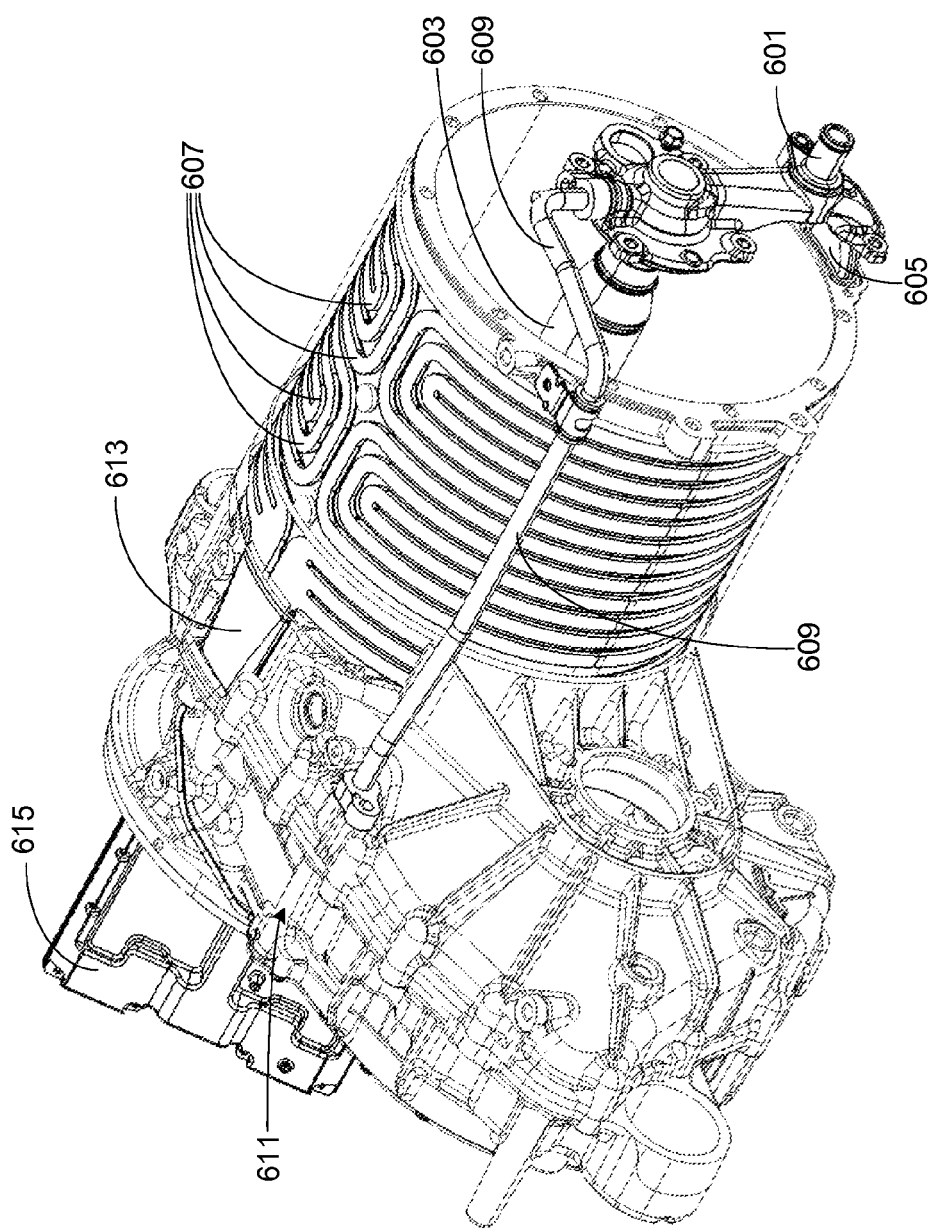
FIG. 6 provides a perspective view of the integrated drive assembly from the coolant inlet side with multiple outer housing members removed in order to show the coolant delivery system.
Figure 7:
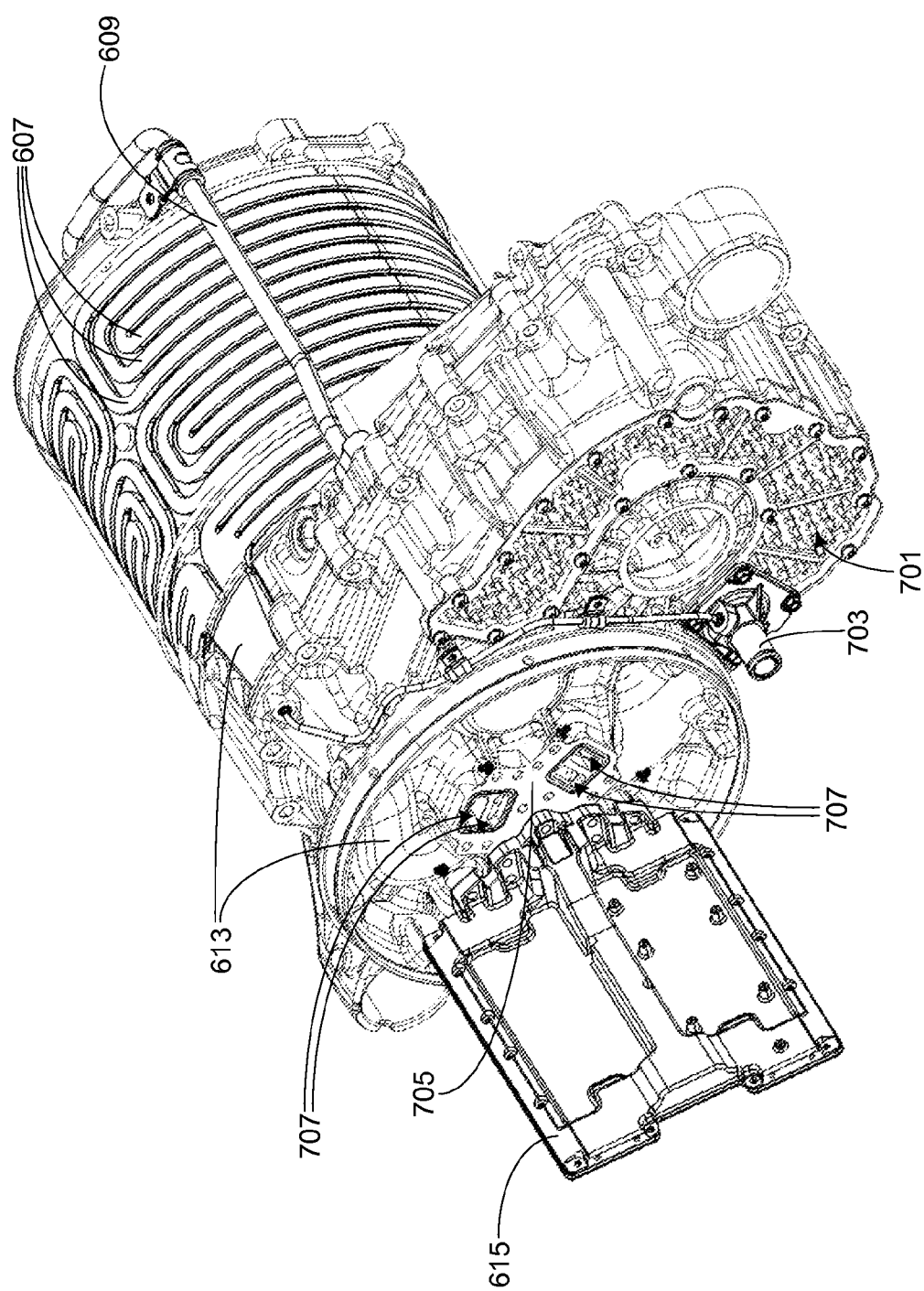
FIG. 7 provides an alternate perspective view of the assembly shown in FIG. 6 from the coolant outlet side.
Figure 8:
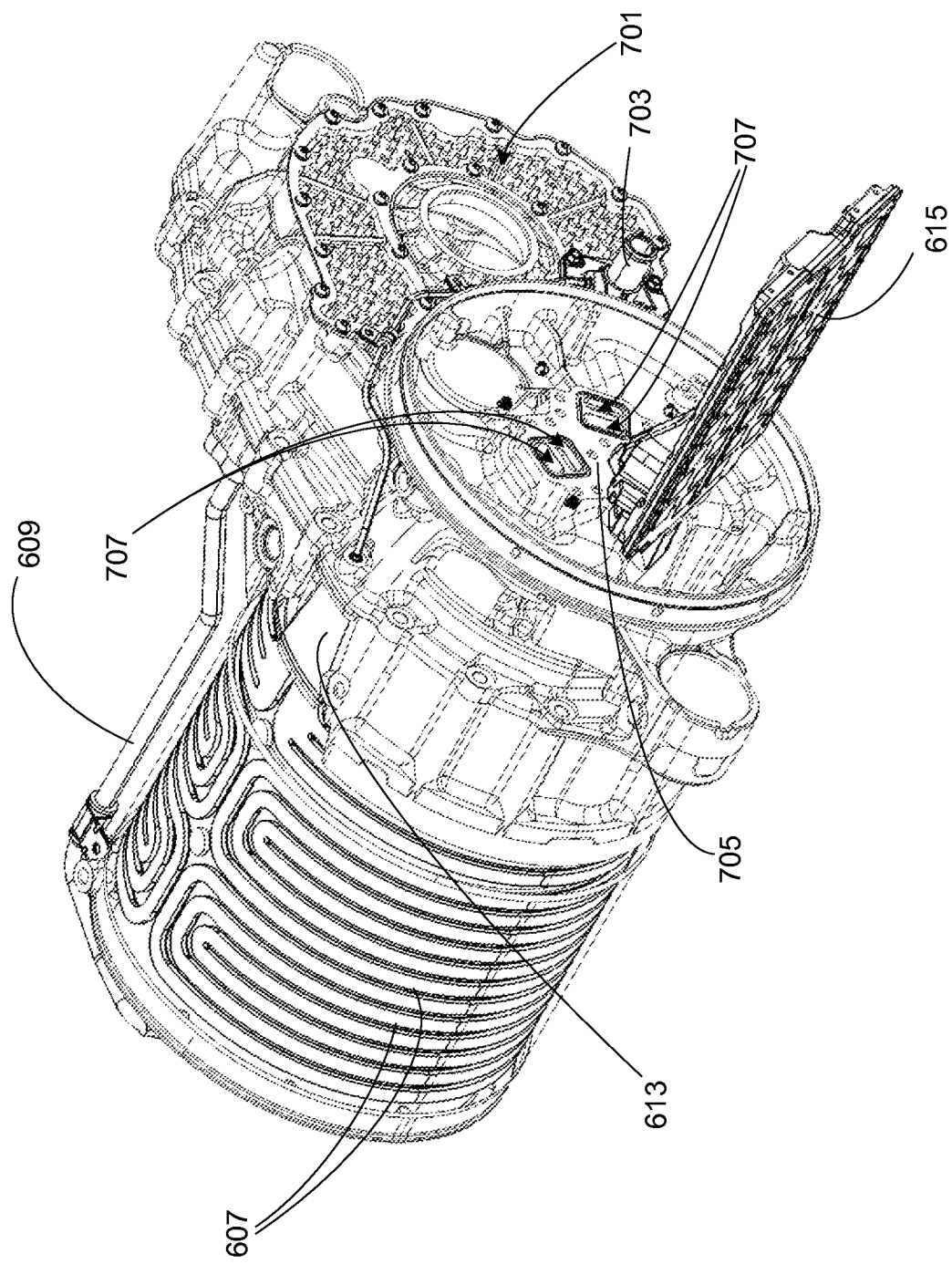
FIG. 8 provides another perspective view of the assembly shown in FIG. 7.
Figure 9:
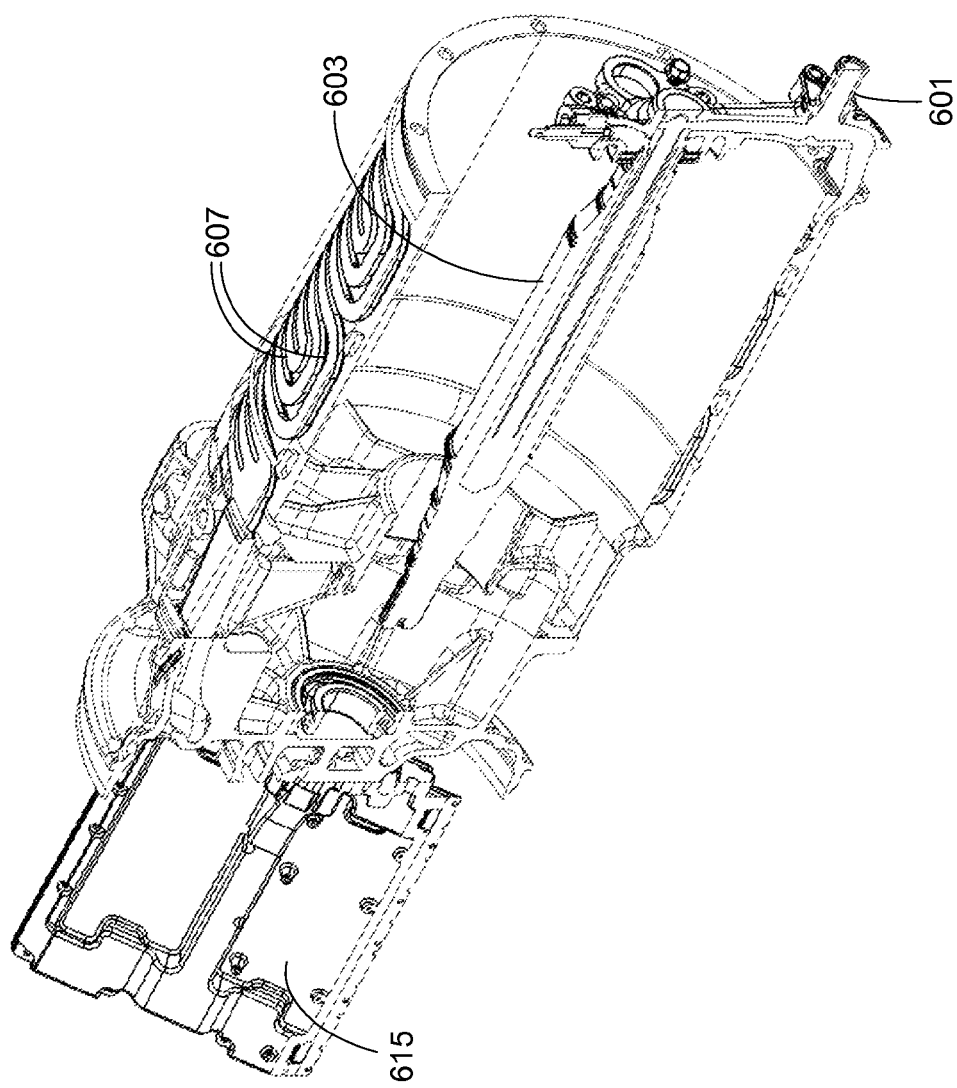
FIG. 9 provides a cross-sectional view of the assembly shown in FIGS. 6-8.

FIGS. 6-8 show three perspective views of integrated motor assembly 101. FIG. 9 provides a cross-sectional view of the same assembly. In order to provide a clearer view of the cooling assembly in FIGS. 6-9, the outer cover and the end cap for motor 105 are removed as are the outer inverter housing and gearbox cover 505.

A coolant conduit from the vehicle's thermal management system (e.g., from cooling system 123) is coupled to inlet 601 of the drive assembly. In the preferred embodiment, the coolant entering the assembly is at 40° C. with a nominal flow rate of 15 liters per minute. Coolant flow is immediately split into two coolant flow paths, the first path passing into the core of the motor rotor 603, the second path flowing through stator coolant inlet 605 before flowing through a plurality of stator coolant channels 607. Approximately 20% of the coolant entering inlet 601 is directed to cool rotor 603, with the remaining approximately 80% flowing through the stator coolant channels 607.

In the preferred embodiment, the coolant that is directed into the rotor enters an inner rotor inlet and then flows down the length of the rotor before being redirected to cool the outer rotor surface. An exemplary implementation of such a rotor cooling assembly is disclosed in U.S. Pat. No. 7,489,057, issued 10 Feb. 2009, and U.S. Pat. No. 7,579,725, issued 25 Aug. 2009, the disclosures of which are incorporated herein for any and all purposes.

After passing through the rotor, the coolant flows through an outer rotor outlet before entering coolant line 609. In this embodiment, the coolant flowing through line 609 is at a temperature of 46° C. Coolant line 609 is coupled to gearbox 115, and more specifically, to an internal gearbox coolant line 611. The coolant exits this coolant line and passes over gearbox coolant plate 701 before passing through outlet 703 of the drive assembly.

As noted above, approximately 80% of the coolant entering through drive assembly inlet 601 flows through stator coolant channels 607 before exiting the stator assembly via internal stator to inverter coolant passageway 613. After passing through the stator housing the temperature of the coolant has been raised approximately 4° C., i.e., to a temperature of 44° C. Passageway 613 is designed to optimize the spread of coolant over the interface between the inverter and the gearbox, thus helping to thermally isolate the inverter from the higher temperatures associated with gearbox 115. Passageway 613 is coupled to coolant manifold 705. Coolant manifold 705 includes three coolant inlet/outlet pairs 707 which, in turn, are coupled to three drive inverter phase cold plates 615, one of which is shown in FIGS. 6-9, that cool the semiconductor devices within the assembly. After passing through the inverter cold plates, the coolant is recombined with the coolant from the gearbox at outlet 703. In the illustrated and preferred embodiment, the coolant exits the inverter cold plates at 44° C. while the coolant flowing through the gearbox coolant plate exits at 61.5° C. After mixing, the coolant exits drive system assembly 101 at 48° C., i.e., 8° C. higher than the entering coolant.

In a preferred embodiment, the output bus bars from inverter 111 are positioned adjacent to the coolant passageways in the gearbox with a thermal interface material interposed between the two, thus allowing the coolant system to help cool the bus bars.

In addition to allowing the use of a common thermal management system and improved electrical connectors between the inverter and the motor, the present integrated assembly also helps to balance vehicle weight by locating the motor on one side of the vehicle center line and the power inverter on the other side of the vehicle center line as illustrated in FIG. 2. This configuration also minimizes wasted space by allowing the entire integrated assembly to fit within structural subframe member 103. Additionally, given the location of gearbox 115 within the center of assembly 101 and the overall symmetry of the assembly and mounting structure, equivalent drive system components (e.g., half shafts 107) may be used on both sides, thus further improving vehicle balance. Lastly, due to the combined mass of the assembly, i.e., the motor, gearbox and inverter, greater mass dampening is allowed, thereby decreasing noise and vibration from the gear train as perceived within the passenger cabin.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. An integrated drive system assembly of an electric vehicle, comprising:
   a single, multi-piece enclosure;
   an electric motor disposed within said single, multi-piece enclosure;
   a power inverter assembly operable to convert DC current supplied by an energy storage system of said electric vehicle to AC current capable of operating said electric motor, wherein said power inverter assembly is disposed within said single, multi-piece enclosure;
   a gearbox disposed within said single, multi-piece enclosure and coupled to said electric motor, wherein said electric motor is coupled to a drive train of said electric vehicle via said gearbox, and wherein said electric motor provides propulsive power to said electric vehicle; and
   a mutual thermal management system coupled to said integrated drive system assembly and comprised of a liquid coolant loop containing a liquid coolant, wherein said liquid coolant loop is thermally coupled to said electric motor, said power inverter assembly and said gearbox.

2. The integrated drive system assembly of claim 1, said liquid coolant loop further comprising a plurality of stator coolant channels, a gearbox coolant plate, and at least one inverter cold plate.

3. The integrated drive system assembly of claim 1, wherein said liquid coolant loop is coupled to said integrated drive system assembly via a single coolant inlet and a single coolant outlet.

4. The integrated drive system assembly of claim 3, wherein after said single coolant inlet said mutual thermal management system is configured to split said liquid coolant loop into a first coolant flow path and a second coolant flow path, wherein said liquid coolant within said first coolant flow path flows through an electric motor rotor and a gearbox coolant plate before passing through said single coolant outlet, and wherein said liquid coolant within said second coolant flow path flows through a plurality of stator coolant channels and at least one inverter cold plate before passing through said single coolant outlet.

5. The integrated drive system assembly of claim 4, wherein said at least one inverter cold plate is comprised of three drive inverter phase cold plates.

6. The integrated drive system assembly of claim 4, wherein said mutual thermal management system directs approximately 20% of said liquid coolant entering said integrated drive system assembly via said single coolant inlet through said first coolant flow path and directs approximately 80% of said liquid coolant entering said integrated drive system assembly via said single coolant inlet through said second coolant flow path.

7. The integrated drive system assembly of claim 4, wherein said plurality of stator coolant channels are mechanically and thermally coupled to an outer housing member of a motor stator corresponding to said electric motor.

8. The integrated drive system assembly of claim 4, wherein said liquid coolant within said second coolant flow path passes through an internal stator to inverter coolant passageway, wherein said internal stator to inverter coolant passageway is interposed between said plurality of stator coolant channels and said at least one inverter cold plate.

9. The integrated drive system assembly of claim 8, further comprising a coolant manifold within said power inverter assembly, wherein said liquid coolant flows through said internal stator to inverter coolant passageway before flowing into said coolant manifold, wherein said coolant manifold is comprised of a plurality of coolant inlet and outlet pairs, and wherein said liquid coolant flows through said plurality of coolant inlet and outlet pairs into and out of said at least one inverter cold plate.

10. The integrated drive system assembly of claim 1, further comprising a plurality of solid metal bus bars electrically connecting a power inverter output of said power inverter assembly to an electric motor power input of said electric motor, wherein said plurality of solid metal bus bars are disposed within said single, multi-piece enclosure.

11. The integrated drive system assembly of claim 10, wherein each of said plurality of solid metal bus bars is comprised of a solid copper conductor.

12. The integrated drive system assembly of claim 10, wherein each of said plurality of solid metal bus bars is less than 20 centimeters long, less than 3 centimeters wide, and less than 0.7 centimeters thick.

13. The integrated drive system assembly of claim 1, further comprising a subframe structural member, wherein said integrated drive system assembly is attached to said subframe structural member via a pair of brackets attached to said single, multi-piece enclosure.

14. The integrated drive system assembly of claim 1, wherein said gearbox is a single speed, fixed gear gearbox, and wherein said gearbox is coupled to a first drive half shaft and a second drive half shaft.

15. The integrated drive system assembly of claim 1, wherein said energy storage system of said electric vehicle is comprised of a battery pack, wherein said battery pack is comprised of a plurality of electrically interconnected batteries.

16. The integrated drive system assembly of claim 1, wherein said electric motor is comprised of an AC motor.

* * * * *